(12) United States Patent
Ramb

(10) Patent No.: US 10,968,768 B2
(45) Date of Patent: Apr. 6, 2021

(54) TURBOCHARGER WITH ADJUSTABLE VANES

(71) Applicant: BorgWarner Inc., Auburn Hills, MI (US)

(72) Inventor: Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 387 days.

(21) Appl. No.: 15/318,381

(22) PCT Filed: Jun. 17, 2015

(86) PCT No.: PCT/US2015/036178
§ 371 (c)(1),
(2) Date: Dec. 13, 2016

(87) PCT Pub. No.: WO2015/195766
PCT Pub. Date: Dec. 23, 2015

(65) Prior Publication Data
US 2017/0122124 A1 May 4, 2017

(30) Foreign Application Priority Data

Jun. 20, 2014 (DE) .................. 10 2014 211 857

(51) Int. Cl.
*F01D 17/16* (2006.01)
*F02B 37/24* (2006.01)
(Continued)

(52) U.S. Cl.
CPC ............. *F01D 17/165* (2013.01); *F01D 5/04* (2013.01); *F01D 9/041* (2013.01); *F01D 25/24* (2013.01);
(Continued)

(58) Field of Classification Search
CPC .......... F01D 17/165; F01D 5/04; F01D 9/041; F01D 25/24; F01D 17/16; F02B 37/24;
(Continued)

(56) References Cited

U.S. PATENT DOCUMENTS 4,146,815 A * 3/1979 Childeric ............... H01J 35/106
378/144
4,365,011 A * 12/1982 Bernard ............... H01M 8/1253
264/618

(Continued)

FOREIGN PATENT DOCUMENTS

CN           1118416 A      3/1996
DE     102012201135 A1     8/2013
(Continued)

OTHER PUBLICATIONS

International Search Report and Written Opinion in International Application No. PCT/US2015/036178, dated Oct. 7, 2015.

(Continued)

*Primary Examiner* — David Hamaoui
*Assistant Examiner* — John D Bailey
(74) *Attorney, Agent, or Firm* — Eric L. Doyle; Stephan A. Pendorf; Patent Central LLC

(57) ABSTRACT

A turbocharger (1) with variable turbine geometry (VTG). A multiplicity of guide vanes (7) each have a vane shaft (8) mounted in the vane bearing ring (6). An adjusting ring (5) is operatively connected to the guide vanes (7) by way of associated vane levers (20) which are fastened to the vane shafts (8) at one of their ends. Each vane lever (20) has, at the other end, a lever head (23) which can be placed in engagement with an associated engagement recess (24) of the adjusting ring (5). An actuation device (11) has an inner lever (26) which is arranged in the turbine housing (2) and which is connected by means of an adjustment pin (25) to (Continued)

Figure 1:
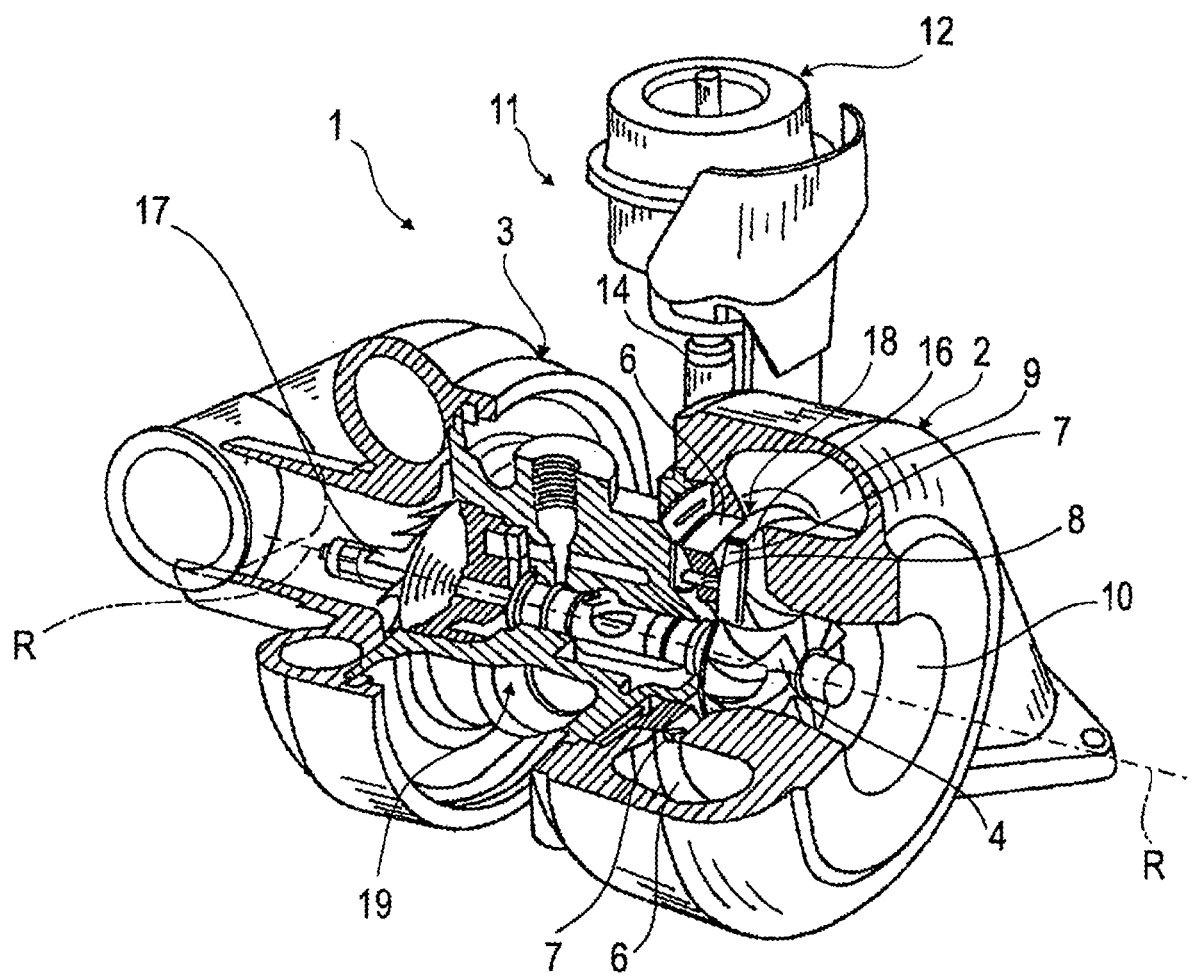

the adjusting ring (5). The adjustment pin (25) has a welding bolt (27) on which a wear-resistant sleeve (28) is arranged.

12 Claims, 2 Drawing Sheets

(51) Int. Cl.
    *F01D 9/04*     (2006.01)
    *F01D 25/24*     (2006.01)
    *F01D 5/04*     (2006.01)
    *F02C 6/12*     (2006.01)

(52) U.S. Cl.
    CPC ............... *F02B 37/24* (2013.01); *F02C 6/12* (2013.01); *F05D 2220/40* (2013.01); *F05D 2230/22* (2013.01); *F05D 2240/54* (2013.01); *F05D 2260/50* (2013.01); *Y02T 10/12* (2013.01)

(58) Field of Classification Search
    CPC .... F02C 6/12; F05D 2220/40; F05D 2230/22; F05D 2240/54; F05D 2260/50; Y02T 10/144
    USPC .......................................................... 415/164
    See application file for complete search history.

(56) References Cited

U.S. PATENT DOCUMENTS

| | | | | |
|---|---|---|---|---|
| 5,324,053 A * | 6/1994 | Kubota | .................. | B23Q 3/154 269/8 |
| 5,498,186 A * | 3/1996 | Benz | .................... | H01J 35/101 445/28 |
| 5,498,187 A * | 3/1996 | Eggleston | ............ | H01J 35/101 445/28 |
| 5,547,410 A * | 8/1996 | Eggleston | ................ | H01J 9/18 445/28 |
| 5,569,091 A | 10/1996 | Haage et al. | | |
| 5,616,423 A * | 4/1997 | Sanjyou | .................. | B32B 15/01 428/632 |
| 5,762,737 A * | 6/1998 | Bloink | .................... | B32B 18/00 156/89.11 |
| 5,891,206 A * | 4/1999 | Ellingson | ................ | B24B 13/01 451/12 |
| 6,019,668 A * | 2/2000 | Ramanath | .................. | B24B 1/00 451/41 |
| 6,080,335 A * | 6/2000 | Ohshita | ................ | B22F 1/0059 252/500 |
| 6,093,092 A * | 7/2000 | Ramanath | ................ | B24D 3/08 451/541 |
| 6,322,746 B1 * | 11/2001 | LaSalle | .................. | B22F 3/225 419/6 |
| 6,372,346 B1 * | 4/2002 | Toth | ........................ | B22F 1/025 428/403 |
| 7,207,770 B2 * | 4/2007 | Bruce | .................. | F01D 17/162 415/160 |
| 7,364,401 B2 * | 4/2008 | Nakagawa | ................ | F02C 6/12 415/164 |
| 8,651,804 B2 * | 2/2014 | Hall | ........................ | F02B 39/00 415/164 |
| 9,664,064 B2 * | 5/2017 | Stilgenbauer | ........... | F02B 37/24 |
| 2003/0064225 A1 * | 4/2003 | Ohashi | .............. | H01J 37/32504 428/408 |
| 2004/0058154 A1 * | 3/2004 | Lau | .................. | C04B 35/62865 428/408 |
| 2005/0036898 A1 * | 2/2005 | Sweetland | .............. | F01D 5/048 419/6 |
| 2006/0017983 A1 | 1/2006 | Syri et al. | | |
| 2006/0126266 A1 * | 6/2006 | Jain | ...................... | H01G 4/1218 361/303 |
| 2007/0180689 A1 * | 8/2007 | Day | ........................ | H01M 8/12 29/623.5 |
| 2008/0014455 A1 * | 1/2008 | Pyzik | .................... | C04B 41/009 428/539.5 |
| 2009/0180862 A1 * | 7/2009 | Ohishi | .................... | B21D 22/02 415/159 |
| 2010/0293946 A1 * | 11/2010 | Vick | ........................ | F28F 21/04 60/643 |
| 2011/0162550 A1 * | 7/2011 | Hash | ....................... | F42B 30/02 102/506 |
| 2012/0251299 A1 * | 10/2012 | Ramb | ..................... | F02B 37/24 415/159 |
| 2014/0093407 A1 * | 4/2014 | Calkins | .................... | C08F 8/44 417/405 |
| 2014/0321991 A1 * | 10/2014 | Ihli | ........................ | F01D 17/165 415/151 |
| 2014/0369811 A1 * | 12/2014 | Malins | .................. | F01D 25/186 415/111 |
| 2015/0086340 A1 * | 3/2015 | Ramb | .................... | F04D 27/002 415/148 |
| 2015/0118029 A1 * | 4/2015 | Radke | .................... | F02B 39/00 415/159 |
| 2015/0184534 A1 * | 7/2015 | Yoshida | .................. | F01D 17/16 415/159 |
| 2015/0308330 A1 * | 10/2015 | Arnold | .................. | F01D 17/165 60/602 |
| 2017/0145912 A1 * | 5/2017 | Micanek | ................ | F01D 17/165 |
| 2017/0254209 A1 * | 9/2017 | Smoke | .................... | F01D 5/187 |

FOREIGN PATENT DOCUMENTS

| | | |
|---|---|---|
| JP | 2006220092 A | 8/2006 |
| WO | 2013163023 A1 | 10/2013 |
| WO | 2013163024 A1 | 10/2013 |

OTHER PUBLICATIONS

Chinese Office Action (with English language translation) dated Dec. 1, 2017, in Chinese Application No. 201580033668.9.
Chinese Office Action (with English language translation) dated Feb. 25, 2019, in Chinese Application No. 201580033668.9.
Mechanical Design Handbook (vol. 1), edited by Cheng, Daxian, p. 364, Chemical Industry Press, May 2000, version 1.
Japanese Office Action (with English language translation) drafted on Nov. 28, 2018, in Japanese Application No. 2016-572592.

\* cited by examiner

TURBOCHARGER WITH ADJUSTABLE VANES

The invention relates to a turbocharger according to the preamble of claim 1.

A turbocharger of this type is known from EP 1 564 380 A1.

For the connection of an inner lever of an actuating device, an adjustment pin is provided which, at one side, is connected to the adjusting ring and, at the other side, engages with the inner lever. The high-grade base material in conjunction with the wear-optimized surface must ensure durability. However, in the case of the generic turbocharger, this can be realized only with compromises in terms of welding quality and/or in terms of wear resistance.

It is therefore an object of the present invention to provide a turbocharger of the type specified in the preamble of claim 1, with which it is possible to realize both high welding quality and high wear resistance of an adjustment pin of the turbocharger guide apparatus.

This object is achieved by the features of claim 1. The subclaims relate in each case to further aspects which may be combined with one another in any desired technologically expedient manner. The description, in particular in conjunction with the figures, characterizes and specifies the invention further.

Accordingly, the invention provides a turbocharger with variable turbine geometry, having a turbine housing with a supply duct for exhaust gases; having a turbine wheel which is rotatably mounted in the turbine housing; and having a guide apparatus, which surrounds the turbine wheel radially at the outside, which has a vane bearing ring, which has a multiplicity of guide vanes which each have a vane shaft mounted in the vane bearing ring, which has an adjusting ring which is operatively connected to the guide vanes by way of associated vane levers which are fastened to the vane shafts at one of their ends, wherein each vane lever has, at the other end, a lever head which can be placed in engagement with an associated engagement recess of the adjusting ring, and having an actuation device which has an inner lever which is arranged in the turbine housing and which is connected by means of an adjustment pin to the adjusting ring, characterized in that the adjustment pin has a welding bolt on which a wear-resistant sleeve is arranged.

In one refinement, the welding bolt is formed from a material with good welding characteristics. In this way, the welding bolt can be welded to the adjusting ring without great effort.

In one refinement, the welding bolt has a cylindrical bolt body which is equipped, on one end, with a support disk. The support disk forms an areal abutment between the welding bolt and the adjusting ring.

In a further refinement, the support disk has a greater diameter than the bolt body. The support disk thus forms an axial delimitation for the sleeve. The support surface positions the adjustment pin orthogonally with respect to the substantially planar adjusting ring.

In a further refinement, the support disk has a stud pin. During the welding of the adjustment pin to the adjusting ring, the stud pin centers the adjustment pin with precise positioning relative to the adjusting ring.

To receive the stud pin, the adjusting ring may have a receiving recess, which may be shaped correspondingly. The stud pin and/or the receiving recess may furthermore be shaped such that the stud pin can be easily inserted into the receiving recess, for example by way of a conical shape and/or by way of a diameter which, over the axial extent of the stud pin, narrows initially steeply and then more shallowly toward a distal end of the stud pin.

In a further refinement, the bolt body is exposed at the end arranged opposite the support disk. In this way, a welding electrode can be placed in direct contact with the welding bolt, in order to improve the conductivity during the welding process and for the purposes of positioning a welding electrode.

In a further refinement, the sleeve bears against the support disk. Metal injection molding tools for the primary forming of a green product for producing the adjustment pin in the manner described further below from two components, wherein a first component forms the welding bolt and a second component forms the sleeve, are configured correspondingly.

By virtue of the fact that the adjustment pin is formed from two materials, it is possible for the welding bolt to be produced from a material which exhibits good welding characteristics and, on the other hand, for the sleeve to be produced from wear-resistant material, such that it is possible for an optimally suited material to be selected for said two components in a manner dependent on the application.

The adjustment pin can be produced in a method having the steps:

a) injection-molding a first component which exhibits good welding characteristics after a sintering process and which is in the form of a welding bolt, b) insert-molding the welding bolt in a second component which is wear-resistant after a sintering process and which is in the form of a sleeve surrounding the welding bolt, c) sintering, by heating, a green product produced after steps a) and b).

In this way, an adjustment pin is formed which can be welded to the adjusting ring and which exhibits low wear during operation. Step c) may also be performed under the action of pressure.

Figure 2:
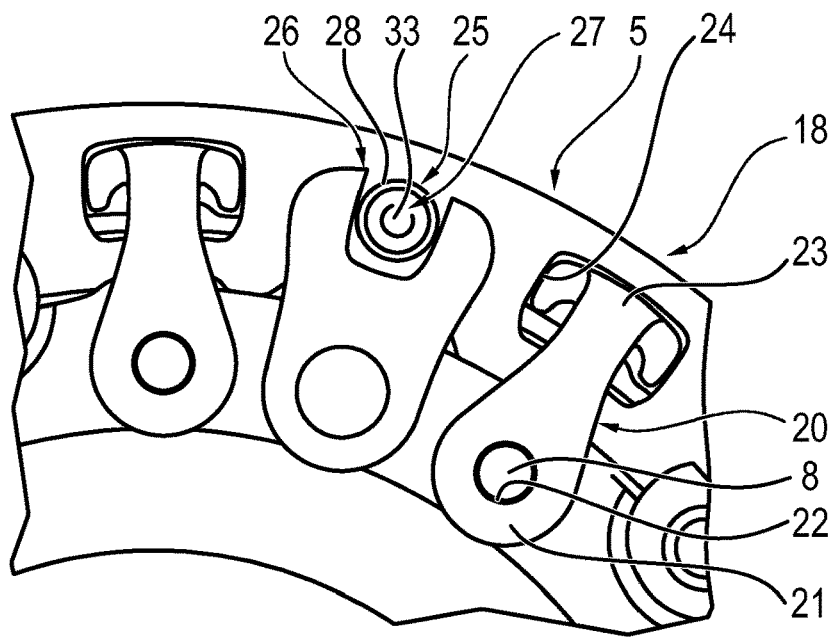
Figure 3:
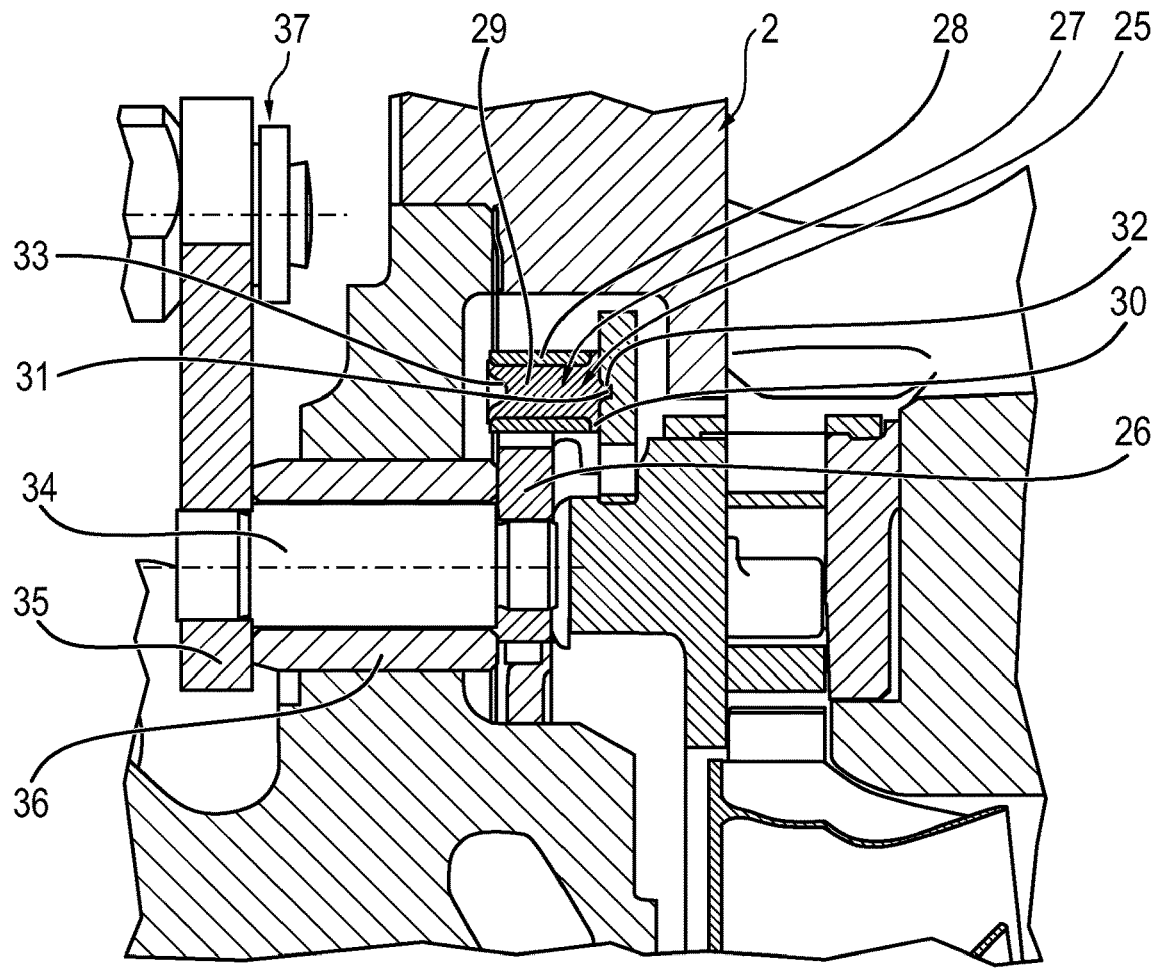

Further details, advantages and features of the invention become apparent from the following description of an exemplary embodiment with reference to the drawing, in which:

FIG. 1 is a sectional, perspective illustration of the basic construction of a turbocharger according to the invention, FIG. 2 shows a plan view of a part of the guide apparatus according to the invention, and FIG. 3 is a sectional illustration of a part of a turbine housing of the turbocharger according to the invention.

FIG. 1 illustrates a turbocharger 1 according to the invention, which has a turbine housing 2 and a compressor housing 3 which is connected to said turbine housing via a bearing housing 19. The housings 2, 3 and 19 are arranged along an axis of rotation R. The turbine housing 2 is shown partially in section in order to illustrate the arrangement of a vane bearing ring 6 as part of a radially outer guide apparatus 18 which has a multiplicity of guide vanes 7 which are distributed over the circumference and which have pivot spindles or vane shafts 8. In this way, nozzle cross sections are formed which are larger or smaller depending on the position of the guide vanes 7 and via which the exhaust gas of an internal combustion engine and/or of a fuel cell supplied via a supply duct 9 and discharged via a central connector pipe 10 impinges to a greater or lesser extent on the turbine wheel 4 mounted in the center on the axis of rotation R, in order, via the turbine wheel 4, to drive a compressor wheel 17 seated on the same shaft.

To control the movement or the position of the guide vanes 7, an actuating device 11 is provided. Said actuating device may be of any desired design, but a preferred embodiment has a control housing 12 which controls the control movement of a plunger element 14 fastened thereto, such that the movement of said plunger element is converted into a slight rotational movement of an adjusting ring 5 situated behind the vane bearing ring 6.

FIG. 2 illustrates a plan view of a part of a guide apparatus 18 on an enlarged scale.

Representatively for all of the vane levers of said guide apparatus 18, one vane lever 20 is illustrated, which at one end has a fastening ring 21 with a recess 22 in which one end of the vane shaft 8 is fixed.

A lever head 23 of the vane lever 20 is arranged in an engagement recess 24 of the adjusting ring 5, and thus engages with the adjusting ring 5.

As can be seen viewing FIGS. 2 and 3 together, the guide apparatus 18 furthermore has an adjustment pin 25 which, at one side, is connected to the adjusting ring 5 and, at the other side, engages with an inner lever 26, which in turn is connected by way of a control shaft 34, visible in FIG. 3, to an outer lever 35, which in turn is operatively connected to the actuating device 11 illustrated in FIG. 1. For this purpose, the control shaft 34 is rotatably mounted in the turbine housing 2 by means of a bearing device 36.

With regard to the construction of the adjustment pin 25, FIGS. 2 and 3 show that said adjustment pin 25 has an inner welding bolt 27 which may be produced from a material with good welding characteristics. Said inner welding bolt 27 is welded to the adjusting ring 5. For this purpose, in the particularly preferred embodiment illustrated in FIGS. 2 and 3, the welding bolt 27 has a cylindrical bolt body 29. Said cylindrical bolt body 29 is surrounded over its entire length by a wear-resistant sleeve 28, as can be seen in particular from FIG. 3. On one end, the bolt body 29 is equipped with a support disk 30 which, in the embodiment illustrated in FIGS. 2 and 3, has a greater outer diameter than the bolt body 29. In the particularly preferred embodiment illustrated in FIGS. 2 and 3, on the bottom side, facing toward the adjusting ring 5, the support disk 30 has a stud pin 31 which can engage into a receiving recess 32 of the adjusting ring 5. The welding bolt 27 is welded to the adjusting ring 5, which can be performed particularly easily in the case of the embodiment according to the invention because the material of the welding bolt 27 may be selected to be a material which exhibits particularly good welding characteristics.

As illustrated in FIGS. 2 and 3, the welding bolt 27 is equipped, on its end remote from the adjusting ring 5, with an optional central recess 33 which is open on one side.

The further advantage, discussed in the introduction, of high wear resistance is ensured through the selection of the material of the sleeve 28. As illustrated in FIG. 3, in the embodiment illustrated therein, the sleeve 28 abuts against the support disk 30 and can be fixed to the welding bolt in a suitable manner, for example by way of an interference fit or similar suitable connecting means. One option for the production of the component assembly composed of welding bolt 27 and sleeve 28 is a MIM compound casting process. Here, "MIM" stands for Metal Injection Molding (powder injection molding). In this case, a metal powder provided with a binding agent is processed in an injection molding process. The binding agent is subsequently removed, and a sintering process is performed.

In the MIM compound casting process, it is preferably provided that the sleeve 28 and the welding bolt 27 are molded from a metal powder which is provided with a binding agent and which is composed of two components, wherein the sleeve 28 together with the welding bolt 27 form a single green product. The binding agent is removed from the green product. The brown product, with the binding agent removed, is sintered in order to produce the adjustment pin 25.

The wear-resistant alloy of the finished sleeve 28 preferably comprises the following:

25% to 35%, preferably 28% to 33% chromium, and/or
3% to 20%, preferably 5% to 15% tungsten, and/or
1% to 4% carbon, and/or
0.5% to 3% silicon.

The alloy is preferably based on cobalt, with a cobalt content of at least 20%.

An example of a material with good welding characteristics for the welding bolt 27 is 1.4571/X6CrNiMoTi17-12-2.

Even though the principles of the present invention have been discussed above on the basis of the example of the adjustment pin 25 of the guide apparatus 18, it is basically conceivable for these principles according to the invention to also be applied to other regions of the exhaust-gas turbocharger at which wear problems are encountered. An example for this is the bolt 37, visible in FIG. 3, of the outer lever 35.

To supplement the disclosure, reference is hereby explicitly made to the illustrative presentation of the invention in FIGS. 1 to 3. At least one exemplary embodiment has been presented in the above description. It is however self-evident that further variations are possible. Furthermore, it should be noted that the respective exemplary embodiments are merely examples and should not be regarded as restricting the scope, the use or the configuration of the content of the disclosure. Rather, at least one possibility for the implementation of the exemplary embodiment will emerge to a person skilled in the art from the detailed description above. It is also self-evident that various changes may be made to the functions and arrangement of the elements without departing from the scope of protection of the invention as defined in the appended claims and legally equivalent documents.

LIST OF REFERENCE SIGNS

1 Turbocharger/exhaust-gas turbocharger
2 Turbine housing
3 Compressor housing
4 Turbine wheel
5 Adjusting ring
6 Vane bearing ring
7 Guide vanes
8 Vane shaft
9 Supply duct
10 Axial connector
11 Actuating device
12 Control housing
14 Plunger element
17 Compressor wheel
18 Guide apparatus
19 Bearing housing
20 Vane lever
21 Fastening ring
22 Recess
23 Lever head
24 Engagement recesses
25 Adjustment pin (composite material pin or pin composed of two materials)
26 Inner lever
27 Welding bolt
28 Sleeve
29 Bolt body 30 Support disk
31 Stud pin
32 Receiving recess
33 Recess open on one side
34 Control shaft
35 Outer lever
36 Bearing device
37 Bolt
R Axis of rotation

The invention claimed is:

1. A turbocharger (1) with variable turbine geometry (VTG), having
 a turbine housing (2) with a supply duct (9) for exhaust gases;
 a turbine wheel (4) which is rotatably mounted in the turbine housing (2); and
 a guide apparatus (18),
  which surrounds the turbine wheel (4) radially at the outside,
  which has a vane bearing ring (6),
  which has a multiplicity of guide vanes (7) which each have a vane shaft (8) mounted in the vane bearing ring (6),
  which has an adjusting ring (5) which is operatively connected to the guide vanes (7) by way of associated vane levers (20) which are fastened to the vane shafts (8) at one of their ends, wherein each vane lever (20) has, at the other end, a lever head (23) which can be placed in engagement with an associated engagement recess (24) of the adjusting ring (5), and
  an actuation device (11) which has an inner lever (26) which is arranged in the turbine housing (2) and which is connected by means of an adjustment pin (25) to the adjusting ring (5),
 wherein the adjustment pin (25) is welded at a first end to the adjusting ring (5) and has a welding bolt (27) on which a wear-resistant sleeve (28) is arranged, wherein the welding bolt (27) is made of a metal alloy which exhibits better welding characteristics than the wear-resistant sleeve (28), and wherein the wear-resistant sleeve (28) is made of a metal alloy which exhibits better wear resistance than the welding bolt (27), and wherein the wear-resistant sleeve (28) on the welding bolt (27) is metal-injection-molded,
 wherein the welding bolt (27) has a cylindrical bolt body (29) which is equipped, on the first end, with a support disk (30), and is equipped, on a second end, with a central recess (33) which is open on one side, and
 wherein the support disk (30) has a stud pin (31) with a conical shape and/or a diameter which, over the axial extent of the stud pin (31), narrows initially steeply and then more shallowly toward a distal end of the stud pin (31).

2. The turbocharger as claimed in claim 1, wherein the welding bolt (27) is produced from a material with good welding characteristics.

3. The turbocharger as claimed in claim 1, wherein the support disk (30) has a greater diameter than the bolt body (29).

4. The turbocharger as claimed in claim 3, wherein the adjusting ring (5) has a receiving recess (32) for the stud pin (31).

5. The turbocharger as claimed in claim 1, wherein the bolt body (29) is exposed at the end arranged opposite the support disk (30).

6. The turbocharger as claimed in claim 1, wherein the sleeve (28) surrounds the bolt body (29) over the entire length of the latter.

7. The turbocharger as claimed in claim 1, wherein the sleeve (28) bears against the support disk (30).

8. A guide apparatus (18) for a turbocharger (1) with variable turbine geometry (VTG), which guide apparatus surrounds a turbine wheel (4) of the turbocharger (1) radially at the outside and has the following parts:
 a vane bearing ring (6),
 a multiplicity of guide vanes (7) which each have a vane shaft (8) mounted in the vane bearing ring (6),
 an adjusting ring (5) which is operatively connected to the guide vanes (7) by way of associated vane levers (20) which are fastened to the vane shafts (8) at one of their ends, wherein each vane lever (20) has, at the other end, a lever head (32) which can be placed in engagement with an associated engagement recess (24) of the adjusting ring (5), and
 an adjustment pin (25),
 wherein
 the adjustment pin (25) is welded at a first end to the adjusting ring (5), and the adjustment pin (25) has a welding bolt (27) on which a wear-resistant sleeve (28) is arranged, wherein the welding bolt (27) is made of a metal alloy which exhibits better welding characteristics than the wear resistant sleeve (28), wherein the welding bolt (27) has a cylindrical bolt body (29) which is equipped, on the first end, with a support disk (30), wherein the support disk (30) has a stud pin (31) with a conical shave and/or a diameter which, over the axial extent of the stud pin (31), narrows initially steeply and then more shallowly toward a distal end of the stud pin (31), wherein the welding bolt (27) is equipped, n a second end, with a central recess (33) which is open on one side, and wherein the wear-resistant sleeve (28) is made of a metal alloy which exhibits better wear resistance than the welding bolt (27), wherein the wear-resistant sleeve (28) on the welding bolt (27) is metal-injection-molded.

9. The turbocharger as claimed in claim 1, wherein the wear-resistant sleeve (28) is made of an alloy comprising:
 25% to 35% chromium,
 3% to 20% tungsten,
 1% to 4% carbon,
 0.5% to 3% silicon, or
 20% or more cobalt.

10. The turbocharger as claimed in claim 1, wherein the wear-resistant sleeve (28) is made of an alloy comprising:
 28% to 33% chromium,
 5% to 15% tungsten,
 1% to 4% carbon,
 0.5% to 3% silicon, or
 20% or more cobalt.

11. The turbocharger as claimed in claim 1, wherein the wear-resistant sleeve (28) is sintered on the welding bolt (27).

12. The guide apparatus as claimed in claim 8, wherein the adjusting ring (5) has a receiving recess (32) for the stud pin (31).

* * * * *